Oct. 7, 1952     T. L. BAGGETTE ET AL     2,612,827
RELEASABLE IMPLEMENT CONNECTION
Filed Dec. 9, 1948     2 SHEETS—SHEET 2
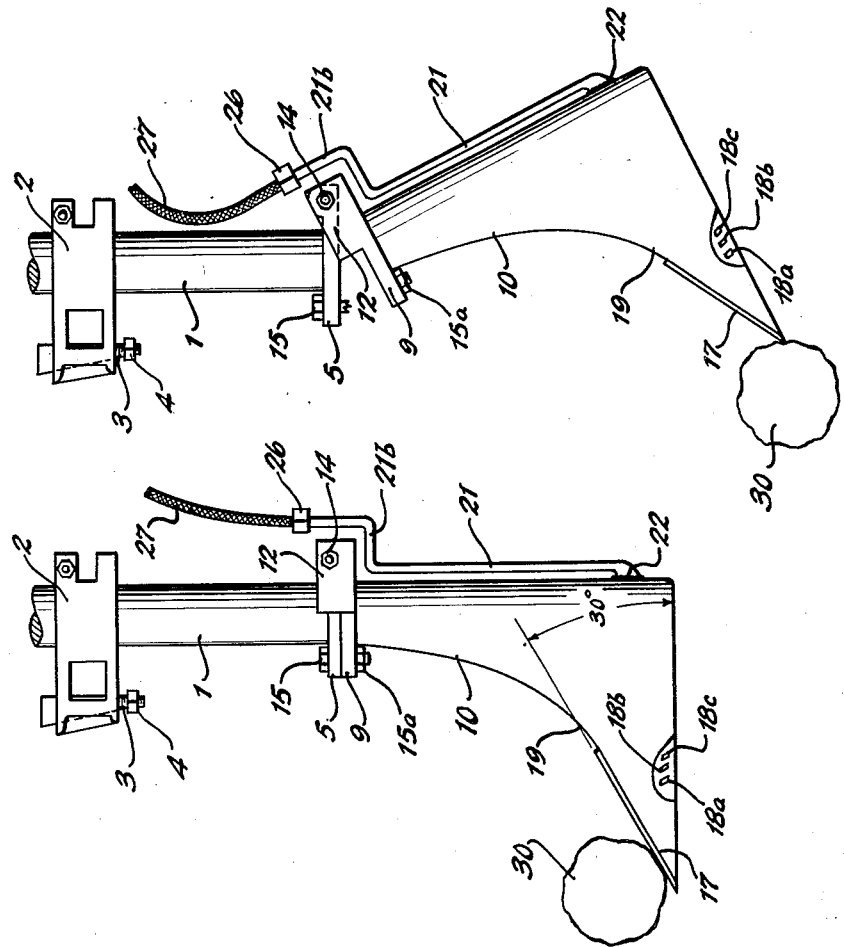
Inventor
THOMAS LAFFIN BAGGETTE.
ALTON RUSSELL COPITHORNE.
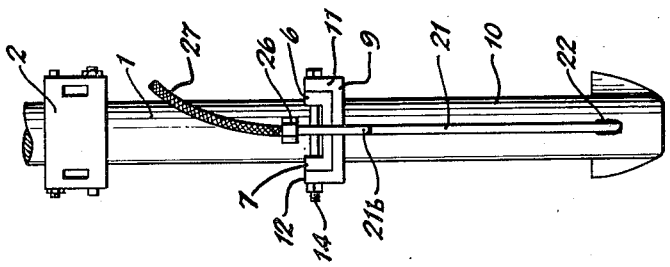
By
John B. Brady
ATTORNEY Patented Oct. 7, 1952

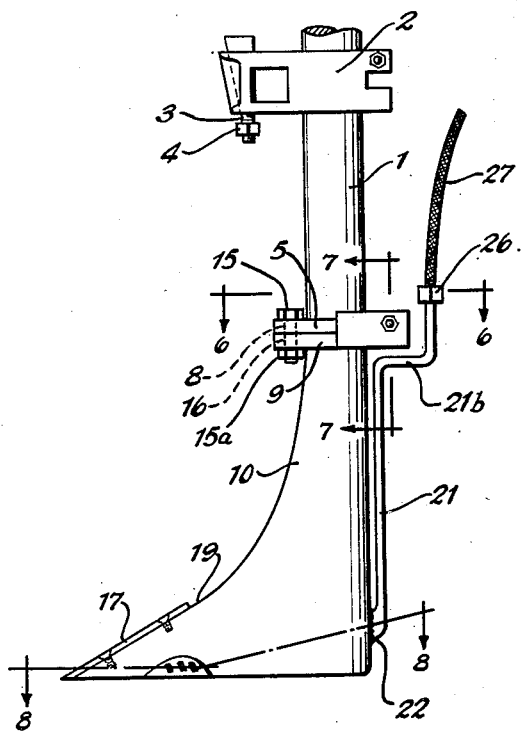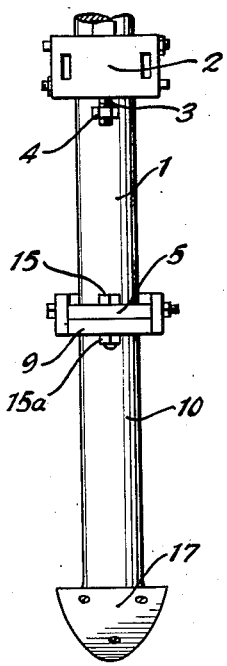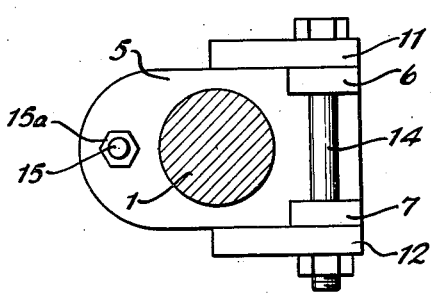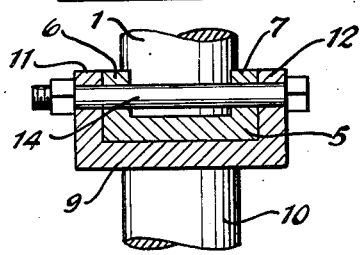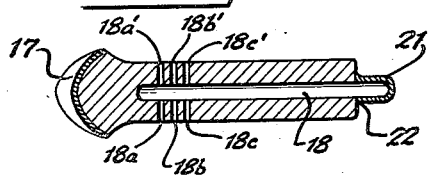

2,612,827

UNITED STATES PATENT OFFICE 2,612,827

RELEASABLE IMPLEMENT CONNECTION

Thomas Laffin Baggette, Leland, Miss., and Alton Russell Copithorne, Chelsea, Mass., assignors, by mesne assignments, to The Sperry Corporation, New York, N. Y., a corporation of Delaware Application December 9, 1948, Serial No. 64,355

3 Claims. (Cl. 97—185)

1

Our invention relates broadly to agricultural implements, and more particularly to a composite plowshare and fertilization injector for fertilizing the soil during the plowing operation.

One of the objects of our invention is to provide a construction of plowshare and fertilizer injector with means for protecting the plowshare and injector against injury incidental to the encountering of obstructions in the course of plowing or cultivating.

A further object of our invention is to provide a construction of composite plowshare and fertilizer injector including a frangible connector for supporting the plowshare whereby abnormal obstructions in the path of the plowshare may cause a release of the plowshare from its support but without physical injury to the plowshare and fertilizer injector.

Other and further objects of our invention reside in an improved mounting for a composite plowshare and fertilization injector, as set forth more fully in the specification hereinafter following by reference to the accompanying drawings, in which:

Figure 1 is a side elevational view of the composite plowshare and fertilization injector of our invention; Fig. 2 is a front elevational view of the composite plowshare and fertilization injector; Fig. 3 is a rear view of the composite plowshare and fertilization injector; Fig. 4 is a schematic view illustrating the composite plowshare and fertilization injector as it encounters an obstruction during its movement in a plowing operation; Fig. 5 is a view showing the severance of the frangible link which supports the composite plowshare and fertilization injector illustrated in Fig. 4, allowing the release thereof for clearing the obstruction without physical injury to the device; Fig. 6 is a transverse sectional view taken substantially on line 6—6 of Fig. 1; Fig. 7 is a vertical sectional view taken substantially on line 7—7 of Fig. 1; and Fig. 8 is an enlarged detail view illustrating the connection between the fertilizer injector and the fertilizer supply line, the view being taken substantially on line 8—8 of Fig. 1.

In the distribution of fertilizer such as anhydrous ammonia in the soil during plowing operations, a very special form of fertilization injector must be employed which requires a tool or plowshare of very special construction. These tools or plowshares are expensive to produce and are often broken during a plowing operation, due to obstructions such as roots or heavy stones which may be encountered in the earth during a plowing operation, with resulting injury to the plowshare and severing of the fertilization supply line, with incidental waste of the fertilizer. Our invention provides an applicator especially adapted for distributing fertilizer in fluid form during a plowing or cultivation operation and wherein the composite plowshare and fertilization injector is so supported that excessive strains incident to the encountering of obstructions in the earth serve to sever a frangible link connector normally supporting the composite plowshare and fertilizer injector. Upon severance of this frangible link, the composite plowshare and fertilizer injector pivots about the pivotal support thereof and allows the applicator to pass over the obstruction without physical injury or breakage of the fertilization supply line and incidental waste of the fertilizer. When the operator observes the release of the composite plowshare and fertilizer injector, the device may be readily restored to normal position by returning the device to substantially vertical position with respect to its support and inserting a new frangible connector. Thus, it becomes unnecessary to renew the applicator.

Referring to the drawings in more detail, reference character 1 represents a depending shank adapted to be attached to the frame of a cultivator or plow by means of a clamp 2 and fastening bolt 3, having securing nut 4 thereon. The shank 1 has substantial thickness, strength and rigidity and terminates in an elongated plate or flange 5 having a pair of upstanding ears 6 and 7 adjacent the rear thereof, said flange or plate being provided with a vertically disposed aperture 8 adjacent the front thereof. The plate or flange 5 extends an appreciable distance forward and backward with respect to the shank 1. Coextensive with the plate or flange 5 we provide an abutting plate or flange 9 secured to the top of the plowshare 10. The plate or flange 9 has a pair of upstanding side portions 11 and 12 which are substantially coextensive with the ears 6 and 7, and are provided with horizontally aligned apertures therein for the passage of the bolt 14. The side portions 11 and 12 extend from a position substantially aligned with the end of the abutting plate or flange 9 to a position substantially coincident with the central axis of shank 1 as illustrated in Figs. 1, 4 and 6. The upstanding ears 6 and 7 are located at the edge of the plate or flange 5 and in contact with the upstanding side portions 11 and 12 of plate or flange 9. The bolt 14 serves as a hinge for the composite plowshare and fertilizer injector about which the device may pivot as represented particularly in Fig. 5. Normally, the plowshare 10 is maintained in the position illustrated in Figs. 1—4 and 6—7. In this position the frangible link constituted by screw-threaded bolt 15 extends vertically through the aperture 8 in plate or flange 5 and the aligned aperture 16 in plate or flange 9 and is secured in position by coacting nut 15a. The flange 5 and the coextensive ears 6 and 7 and flange 9 with its coextensive side portions 11 and 12 are substantially channel shaped in section with the channel shaped section 9—11—12 encompassing the section 5—6—7 while the plowshare 10 is maintained in normal position with respect to the depending shank 1. Thus the plowshare is maintained in a vertically aligned plane of operation and prevented from being angularly twisted in a lateral plane.

The plowshare terminates in the replaceable plowpoint 17, and within the structure thereof we provide a passage 18 for fertilizer, the discharge end of which contains symmetrically arranged discharge orifices. The discharge orifices at one side of the plowpoint are designated at 18a, 18b and 18c, while the discharge orifices on the opposite side are shown at 18a', 18b', and 18c' in Fig. 8, all located ahead of the point 19 at which the upper part of the applicator breaks the soil. The plowpoint 17 extends in a plane approximately 30° to the horizontal as indicated in Fig. 4. The discharge passage 18 is supplied with fertilizer from the fertilizer supply line 21 which is welded to the rear of the plowshare 10 as represented at 22 for distribution of the fertilizer symmetrically on each side of the plowshare through orifices 18a, 18b and 18c and 18a', 18b' and 18c'.

The metallic tube 21 extends upwardly and beneath the horizontally extending plate or flange 9 where it bends at an angle represented at 21b. A coupling device 26 serves to connect flexible conduit 27 with the end of the metallic tube at 21b. The flexible conduit 27 extends downwardly from the cultivator or plow frame where it connects with the fertilizer supply line leading to the fertilizer supply system carried by the vehicle.

Under normal conditions of operation the tractor drawing the vehicle on which the plowshares 10 are supported, advances over the field in performing a plowing operation with the plowshares in the position illustrated in Figs. 1–4 and 6–7. Upon encountering an obstruction 30, as represented in Fig. 4, which would normally tend to physically injure, by twisting or severance, the depending plowshare, the frangible link 15 which is selected to sever under tension before stresses or strains can increase to a point of injury to the plowshare, is severed as represented in Fig. 5, allowing the plowshare to be released. The plowshare pivots about the journal provided by bolt 14 allowing passage of the plowpoint 17 over the obstruction 30, thereby clearing the plowshare of any obstruction without subjecting the plowshare to injurious stress. As the plowshare 10 pivots about journal 14, flexible conduit 27 yields in position as represented in Fig. 5. The frangible link constituted by bolt 15 is readily replaced by placing a new bolt through the aligned apertures 16 and 8 and fastening the bolt in position by nut 15a, whereupon the tractor may proceed. By thus providing for release of the plowshare under conditions of excessive strain, the special tool constituted by the composite fertilizer injector and plowshare is preserved and does not require complete renewal.

While we have described our invention in one of its preferred embodiments, we realize that modifications in details of construction may be made, and we desire that it be understood that no limitations upon our invention are intended other than may be imposed by the scope of the appended claims.

What we claim as new and desire to secure by Letters Patent of the United States is as follows:

1. A releasable implement connection for a ground engaging tool including a vertical depending shank of substantial thickness terminating in a substantially horizontal plate having a length and width exceeding the thickness of said depending shank, the forward portion of said plate having a vertically extending aperture therein and the rearward portion of said plate having a pair of upstanding ears thereon, a plowshare having a vertically extending support axially aligned with said vertical depending shank, the support for said plowshare terminating in a second substantially horizontal plate at the top thereof, said second plate having a shape substantially conforming with the shape of said first mentioned plate and establishing contacting relation with the bottom of the first mentioned plate, said second plate having a pair of rearwardly disposed upstanding side portions aligned with the ears carried by said first mentioned plate, a pivot member extending horizontally through the side portions of said second plate and the ears of said first mentioned plate, said second plate having a vertically disposed aperture in the forwardly extending portion thereof aligned with the vertically extending aperture in said first mentioned plate, and a frangible connector extending through the vertically disposed apertures in both of said plates for maintaining said plowshare in alignment with said shank in a position subject to severance under conditions of excessive strain for releasing said plowshare for angular displacement about said pivot member.

2. A releasable implement connection as set forth in claim 1 in which said side portions of said second plate extend beyond the ears of said first mentioned plate to a position substantially aligned with the central axis of said shaft for substantially restraining said plowshare from angular displacement in a substantially horizontal plane about the vertical axis of said shank.

3. A releasable implement connection as set forth in claim 1 in which said upstanding ears are located at the edge of said first mentioned plate and in contact with the upstanding side portions of said second plate.

THOMAS LAFFIN BAGGETTE.
ALTON RUSSELL COPITHORNE.

REFERENCES CITED

The following references are of record in the file of this patent:

UNITED STATES PATENTS

| Number | Name | Date |
|---|---|---|
| 256,764 | Tenant | Apr. 18, 1882 |
| 268,358 | Deal | Nov. 28, 1882 |
| 272,080 | Norris | Feb. 13, 1883 |
| 656,393 | Davis | Apr. 21, 1900 |
| 1,141,804 | Lamprell et al. | June 1, 1915 |
| 1,207,146 | Dickinson | Dec. 5, 1916 |
| 1,287,930 | Evans | Dec. 17, 1918 |
| 1,739,765 | McEwen | Dec. 17, 1929 |

FOREIGN PATENTS

| Number | Country | Date |
|---|---|---|
| 98,839 | Sweden | Mar. 7, 1940 |
| 553,929 | France | Feb. 20, 1923 |